Feb. 3, 1970   H. O. MARTIN   3,493,828
SOLID STATE P.I. SERVO CIRCUIT
Filed Nov. 1, 1967
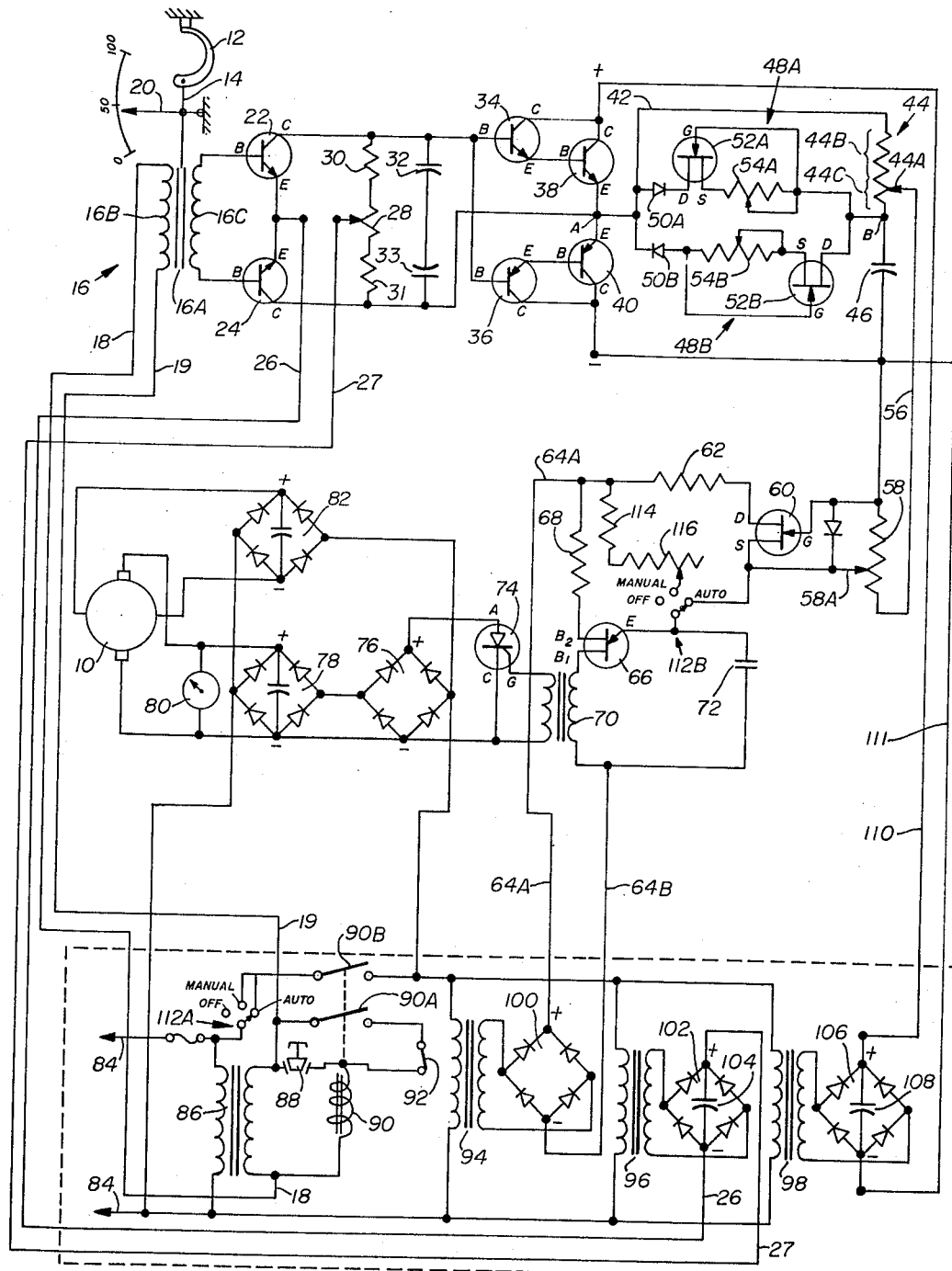
INVENTOR.
HAROLD O. MARTIN
BY *Griswold & Burdick*
ATTORNEYS

United States Patent Office 3,493,828
Patented Feb. 3, 1970

3,493,828
SOLID STATE P.I. SERVO CIRCUIT
Harold O. Martin, Concord, Calif., assignor to The Dow Chemical Company, Midland, Mich., a corporation of Delaware
Filed Nov. 1, 1967, Ser. No. 679,889
Int. Cl. H02p 5/46
U.S. Cl. 318—18                      9 Claims

ABSTRACT OF THE DISCLOSURE

This invention is a servo circuit for regulating a control voltage for maintaining a value of a system at a preselected level. More particularly, the invention relates to a servo circuit comprising means for detecting the sense and magnitude of deviation of the system from a preselected level in the form of a positive or negative voltage, the servo circuit including a DC voltage source, an NPN transistor and a matched PNP transistor, the emitters of the transistors being connected together providing a first circuit common point therebetween, the collector of the PNP transistor being connected to a voltage source positive pole and the collector of the PNP transistor being connected to the voltage source negative pole, the positive error signal being applied to the NPN transistor base electrode and the negative error signal being applied to the PNP transistor base electrode, the voltage at the first circuit common point relative to the voltage source negative pole being a signal voltage proportional to the magnitude and sense of the error signal voltage.

The servo circuit further includes a first and second resistor and a capacitor in series between the first circuit common point and the voltage source negative pole providing a second circuit common point between the seriesed resistors and the capacitor and bidirectional constant current circuit means between the first and second circuit common points regulating the rate of charging and discharging the capacitor, the voltage across the capacitor being a reset voltage signal of a value which is the integral of the signal voltage at the first circuit common point, the output control voltage signal being taken between the seriesed resistors and the voltage source negative pole, the output control voltage signal being a composite of the proportional voltage signal at the first circuit common point and the reset voltage signal across the capacitor. The invention further includes a circuit for providing a positive or negative error signal and a circuit arrangement for utilizing the output control voltage signal to regulate the conduction of a unijunction transistor which in turn is used to control a silicon controlled rectifier.

CROSS-REFERENCES

The invention disclosed herein is not related to any pending United States or foreign patent application.

SUMMARY

Servosystems of the type exemplified by this invention are used to regulate a process input in order to maintain a variable in the process at a preselected value. Such preselected value may be termed a "set point." The circuit of this invention provides an output control voltage signal which is the composite of a proportioning plus reset control signal. "Reset" as used herein does not relate to changing the process variable set point. Rather it means a method of final control in which the setting of a control device is altered in the appropriate direction at a certain rate as long as the process variable is off set point. As the process responds to the change in input of energy or material thereto the deviation of the process variable from set point decreases but the rate of change in the input is not diminished accordingly. When the deviation from set point becomes nil, alteration of the final control device setting is abruptly terminated.

Proportioning is a method of control wherein the rate at which the setting of the final control device is being altered at any given instant is proportional to the rate at which the deviation from set point is then changing. With proportioning control equilibrium can be achieved at the reference position of the final control device only if the input through the device at that setting is precisely that required to maintain the process variable at set point. If a change in the input is required to maintain the variable at set point, equilibrium will only be established at a value of the variable which differs from set point enough to make the control device provide more or less input than is supplied at the zero or reference point setting. Consequently, when proportioning control is utilized the equilibrium value of the process variable will differ from set point or "droop" as long as the process demand differs from that initially corresponding to the zero or reference point setting of the control device. To get the variable back on set point the zero or reference point of the control device has to be reset to accommodate the altered demand.

With reset control, droop does not occur but because the input change being made is not decreased as the process responds, there is a tendency to overshoot and for the process variable to alternately assume values on opposite sides of the set point. Thus, when reset control is used the system tends to cycle. By combining reset and proportional controls both droop and cycling are minimized.

This invention provides a servocontrol circuit utilizing solid state components which incorporates the advantageous features of both proportioning and reset control. The output control voltage of the servosystem of this invention is a composite signal formed of a proportioning signal and a reset signal so that, as above stated, droop and cycling characteristics are minimized by mutual compensation. The circuit of this invention achieves this important control characteristic in a highly economic arrangement utilizing a minimum number of components, all of which are solid state.

DESCRIPTION OF THE DRAWING

The drawing is a schematic diagram of a circuit incorporating the features of this invention showing means of utilizing an error signal, such as produced by a linear differential transformer, to control the voltage applied to a DC motor as the invention may be applied to control the hydraulic pressure in a system including a pump having the motor as the prime mover.

DETAILED DESCRIPTION

Referring to the drawing an embodiment of the solid state servosystem of this invention is diagrammatically illustrated. The invention will be described, by way of example, as applied to control the output of a pump motor 10 acting as a prime mover to supply hydraulic fluid pressure to a system, the invention being used to control the voltage to the motor to achieve substantially constant hydraulic pressure in the system. Hydraulic pressure of the system is detected by a Bourdon tube 12. Linkage 14 connects the movement of the free end of the Bourdon tube to the core 16A of a differential transformer 16. The primary 16B of the differential transformer is supplied with an AC voltage by way of conductors 18 and 19. The position of the core 16B determines the voltage induced into the differential transformer secondary 16C. A pointer 20 is affixed for movement by linkage 14 and points to a scale indicating a preselected fluid pressure.

As the fluid pressure changes, that is, becomes either higher or lower than the preselected level, the Bourdon tube responds to move the differential transfer core element 16A to change the output at the transformer secondary 16C.

The transformer secondary 16C is connected to the base electrodes of differential transistors 22 and 24, each of which is of the NPN type. The emitters of transistors 22 and 24 are common and are connected to a negative DC voltage source by way of conductor 26. Conductor 27 provides a positive DC voltage relative to the conductor 26 which is imparted to the centertap of a potentiometer 28. Resistors 30 and 31 connect from each side of the potentiometer 28 to the cathode circuits of differential transistors 22 and 24. Positioned across the cathode electrodes of transistors 22 and 24 and in parallel with resistors 28, 30 and 31 are seriesed capacitors 32 and 33. Differential transistors 22 and 24 form a demodulating, differential amplifier for the error signal taken from the secondary of linear differential transformer 16. The output across capacitors 32 and 33 is a variable DC voltage which is proportioned to the displacement of the core of the linear differential transformer 16 from a center point. Potentiometer 28 provides means for adjusting the balance of the differential transistors 22 and 24.

The voltage across condensers 32 and 33 is fed to the common bases of amplifying transistors 34 and 36. Transistor 34 is of the NPN type and transistor 36 is of the PNP type.

The emitter of amplifying transistor 34 is connected to the base of sensing transistor 38 of the NPN type and, in like manner, the emitter of amplifying transistor 36 is connected to the base of a PNP sensing transistor 40. The emitters of sensing transistors 38 and 40 are common and a point therebetween is a circuit common point indicated by the letter A. The collectors of amplifying transistor 34 and sensing transistor 38 are each connected to a positive DC voltage source and the collectors of amplifying transistor 36 and sensing transistor 40 are each connected to the negative pole of the DC voltage source.

Sensing transistors 38 and 40 are termed sensing transistors to distinguish them from other transistors in the circuit and to indicate that they sense the direction of the error indicated by the linear differential transformer 16. Transistor 38 conducts when a positive error appears on the base of the amplifying transistor 34 while sensing transistor 40 is nonconducting; contrarily, when a negative error signal appears on the base of amplifying transistor 36, sensing transistor 40 conducts and transistor 38 is nonconducting.

The voltage appearing at point A is a varying DC voltage proportional to the error detected by the linear differential transformer 16. This proportional voltage signal is supplied by way of conductor 42 to a potentiometer 44. Centertap 44A takes off a selected portion of the proportional voltage signal and communicates it to output circuitry to be described subsequently. Potentiometer 44 is the equivalent of two seriesed resistors 44B and 44C, with centertap 44A being the circuit point therebetween.

In addition to the proportional error signal provided by the circuit described to this point, the invention includes means of providing a reset signal, the output of the servosystem circuitry being controlled by a combination or summation of the proportional and reset signals. In series with potentiometer 44 is a signal storage capacitor 46. A second circuit common point, designated by letter B, is provided between potentiometer 44 and capacitor 46. Extending between the circuit common points A and B are two paralleled constant current circuits, indicated generally by the numerals 48A and 48B.

Constant current circuit 48A includes a diode 50A. In series with diode 50A is the drain-source circuit of a field effect transistor 52A and a potentiometer 54A which has its centertap shorted back to one side so that the potentiometer functions as a variable resistor. The gate electrode of field effect transistor 50A is connected to a point on the potentiometer 54A opposite from the source electrode so that the voltage drop across the potentiometer is applied between the gate and the source electrodes. Thus transistor 52A is biased by the voltage drop across potentiometer 54A so that the gate is negative with respect to the source electrode. As this bias is reduced, that is as the gate potential approaches that of the source electrode potential, conduction between the source and the drain increases. If the voltage at circuit point A is more positive than that at circuit point B diode 50A will allow current to flow through field effect transistor 52A. Since the bias for 52A is developed by the same current across potentiometer 54A, transistor 52A will maintain a substantially constant current by increasing the source to drain impedance when the voltage difference between point A and point B is high and decreasing the source to drain impedance when the voltage is low.

Constant current circuit 48B is identical to circuit 48A. Circuit 48B contains a diode 50B, a field effect transistor 52B and a potentiometer 54B all of which are arranged in the same way and perform the same functions as described with reference to circuit 48A, except that diode 50B is oppositely oriented with respect to diode 50A. Diode 50B allows transistor 52B to conduct when the voltage at circuit point A is lower (less positive) than the voltage at circuit point B.

Thus the voltage which is actually applied at the centertap of potentiometer 44 is a function of the voltage across capacitor 46 plus that across the tapped portion 44C of the potentiometer 44.

The constant current drainage of capacitor 46 produces a reset signal at circuit point B. The control signal taken at 44A is thus a function of the proportioning signal at circuit point A and the reset signal at a circuit point B. The control signal is fed by conductor 56 to potentiometer 58, one side of potentiometer 58 being connected to the negative pole of the control voltage potential. Centertap 58A feeds a selected proportion of the control signal voltage to the gate-source circuit of an isolating field effect transistor 60. The drain of isolating transistor 60 is connected through a load resistor 62 to the positive pole of a full wave rectified pulsating voltage source across conductors 64A and 64B. The same voltage source is supplied across the base 1 and base 2 electrodes of a unijunction firing transistor 66. In series with base 2 electrode of firing transistor 66 is a load resistor 68 and in series with the base 1 electrode is the primary of a pulse generating transformer 70. In series with the source electrode of the isolating field effect transistor 60 is a capacitor 72. The voltage across capacitor 72 is applied to the emitter electrode of the unijunction firing transistor 66.

The secondary of firing transformer 70 is connected between the gate and collector electrodes of a silicon controlled rectifier (SCR) 74. The anode electrode of the SCR is connected to a bridge 76.

Thus it can be seen that a transistor 66 provides the driving pulses to fire the SCR 74. As the full wave rectified pulsating voltage for each half line cycle begins to build isolating transistor 60 begins to conduct current in an amount inversely proportional to the bias voltage between its gate and source, which voltage is the control signal voltage from circuit points A plus B. As the isolating transistor begins to conduct capacitor 72 is charged at a rate depending on the drain current. When the voltage across capacitor 72 reaches the firing voltage of unijunction firing transistor 66 the emitter to base 1 of unijunction transistor 66 conducts heavily to discharge capacitor 72 and to generate the gate pulse for SCR 74 through transformer 70. The gate pulse fires SCR 74 producing an electrical short between the positive and negative terminals of bridge 76. This action reduces the impedance of the bridge 76 to that of the forward biased diodes between the AC terminals of the bridge. The AC terminals of bridge 76 are in series with one side of the line and an armature power supply bridge 78. As the line voltage passes through the zero portion of its cycle the SCR is shut off in preparation for the next half cycle. When bridge 76 shorts by the firing of SCR 74 the full AC voltage is applied across the corners of bridge 78 to produce rectified DC voltage across the armature of motor 10.

The above sequence reoccurs each half line cycle. Thus SCR 74 and bridge 76 control the portion of each half line cycle (the total power) which will be delivered to the armature, the portion being determined by the length of the delay (for each half line cycle) before SCR 74 is fired, which in turn is controlled by the time required for capacitor 72 to reach the firing voltage of unijunction firing transistor 76. This, in turn, is determined by the drain current of transistor 60 which is controlled by the signal voltage at circuit points A plus B.

Meter 80 indicates the level of the voltage applied to the armature of motor 10. A field bridge 82 supplies DC current to the field of motor 10.

The power supply to the solid state servo circuit of this invention is shown in dotted outline for purposes of completing the disclosure; however the power supply itself forms no part of the invention herein. Basically the power supply receives current from an AC source across conductors 84, such as a 117 volt AC supply. This power is fed to the primary of a voltage reducing transformer 86. The output from the secondary of transformer 86 is fed by way of conductors 18 and 19 to the primary of differential transformer 16 and also through momentary contact switch 88 to the coil of a relay 90. When switch 88 is closed, relay 90 is energized pulling closed contact points 90A and 90B. Contact point 90A is connected through an emergency release switch 92 back to coil 90 so that when relay 90 is energized it is automatically maintained in closed position. Relay switch 90B supplies full AC power to field bridge 82 as well as bridges 76 and 78. In addition AC power is supplied to the primaries of voltage reducing transformers 94, 96 and 98.

Transformer 94 supplies voltage to a bridge 100 which supplies a full wave unfiltered pulsating unidirectional voltage across conductors 64A and 64B. Transformer 96 supplies voltage to a full wave bridge 102 which is filtered by capacitor 104 so that a DC voltage is supplied to conductors 26 and 27. In the same manner transformer 98 supplies power to bridge 106 filtered by capacitor 108 to supply DC voltage to conductors 110 and 111.

A three position switch is provided having gangs 112A and 112B. The switch has an off, manual and "auto" (automatic) position and is shown in the "auto" position. When in the off position no voltage is applied to any portions of the circuit and motor 10 cannot be energized. In the manual position voltage is supplied by gang 112A to all phases of the circuit; however gang 112B connects a voltage signal to the unijunction firing transistor 66 which is determined only by the voltage drop across resistor 114 and potentiometer 116. Thus with the switch in the manual position the firing of the silicon control rectifier 74 is determined only by the voltage selected by potentiometer 116 and there is no automatic correction of the signal voltage. The voltage across the armature and therefore the power output of motor 10 is governed only by manual positioning of potentiometer 116.

When the switch is in the automatic position, as shown, resistor 114 and potentiometer 116 are out of the circuit and the conduction of firing transistor 66 is controlled by the automatic control signal produced by the circuit heretofore described.

OPERATION

With the switch in the automatic position, as shown, the operation of the servo circuit will now be described. When the pressure output of hydraulic pump actuated by motor 10 rises below or falls above the preselected set point such pressure change is detected by Bourdon tube 112 which displaces the core element 16A of linear differential transformer 16. An error signal is generated by the transformer and is conditioned by the solid state circuitry to make the appropriate correction of pump motor 10 to maintain set point pressure through silicon controlled rectifier circuitry.

Any deviation of the process variable from its set point is detected as a DC error signal corresponding in polarity and voltage to the sense and magnitude of the deviation. The error signal is amplified and applied to the circuit of the invention to develop two different voltages, designated $E_A$ and $E_B$, the voltage $E_A$ appearing at circuit common point A and the voltage $E_B$ at circuit common point B. The IR drop developed across resistor 58 is a function of the voltage $E_A$ and $E_B$ and is applied as a variable bias voltage between the source and gate electrodes of field effect transistor 60 which regulates the electrical power supplied to a final control device which, in the illustrated application, is an electric pump motor, but such device may be a valve, resistance heater, or the like.

The voltage at point $E_A$ is an IR drop proportional to the magnitude of the amplified error signal and therefore provides proportional control. The voltage $E_B$ is the potential across capacitor 46 which charges as long as a positive error signal is applied and discharges as long as a negative error signal exists. When no error signal is being generated the control signal voltage across resistor 58 is derived only from $E_B$ which is determined by the charge on capacitor 46 when the last deviation from set point became nil. Thus the voltage $E_B$ provides reset or floating control.

The charge-discharge path for condenser 46 includes paralleled constant current circuits 48A and 48B each of which consists essentially of a self-biasing field effect transistor. The constant current circuits cause the rate at which capacitor 46 charges or discharges to be more nearly constant and is therefore critical to minimizing "droop" of the correction signal. It is obvious that the voltage $E_B$ cannot function perfectly to eliminate droop because the rate of charge-discharge of capacitor 46 cannot be perfectly independent of the magnitude of the error signal. As the process responds to altered signal voltage input the difference between $E_B$ and the error voltage (which is proportional to the error signal) becomes so small that the charge-discharge rate drops off. Consequently some droop is unavoidable, however the use of the constant current legs 48A and 48B instead of a simple resistance in the charge-discharge circuit reduces the droop of the correction signal to a value so small as to be of little concern. In addition, it is actually advantageous to have a lower rate of reset when the deviation from set point is small.

When the error signal is positive, that is the signal between the common bases of amplifying transistors 34 and 36 relative to circuit common point A is positive, sensing transistor 40 exhibits a very high resistance and can be considered as nonconductive. The resistance of sensing transistor 38 decreases rapidly as the magnitude of the positive error signal increases and at the maximum signal voltage constitutes almost a dead short between the cathode and the emitter electrodes. Thus as the error signal voltage approaches the maximum positive value, the voltage at circuit common point A ($E_A$) approaches the full voltage potential developed by bridge 106. This voltage, which is proportional to the error signal, is supplied by conductor 42 to potentiometer 44. With a positive error signal capacitor 46 will tend to charge, thereby increasing $E_B$. Capacitor 46 charges through constant current circuit 48B and through the paralleled high resistance path afforded by potentiometer 58 and the resistance of portion 44B of potentiometer 44.

When the error signal is zero neither of the sensing transistors 38 or 40 will conduct. Capacitor 46 tends to discharge at a low rate through potentiometer 58 and then through the lower portion 44C of potentiometer 44 in parallel with the upper portion 44B of potentiometer 44 plus the constant current leg 48A. The control voltage applied across the gate-source circuit of isolating field effect transistor 60 is equal to the IR drop across potentiometer 58 and the lower portion 44C of potentiometer 44.

When the error signal is negative transistor 38 does not conduct. The resistance of sensing transistor 40 drops rapidly as the magnitude of the negative error signal is increased. At the maximum error signal sensing transistor 40 constitutes almost a dead short between the emitter and collector circuits and therefore circuit common point A is substantially at the level of negative voltage applied by power supply bridge 106. Thus the magnitude of the negative error signal determines the resistance in one of the parallel paths of discharge for capacitor 46 thereby indirectly determining the voltage drop across potentiometer 58. As in the case when no error signal is present, capacitor 46 is the only source of voltage in the circuit and the control voltage is derived from and is less than the voltage across capacitor 46.

Detailed mathematical analysis of the circuit of this invention reveals some important characteristics. Of significance is the fact that analysis shows that the way in which the circuit functions in response to a negative error signal is different from and not simply a reciprocal of the mode of operation with a positive error signal. Analysis shows that the relative degree of proportioning control and reset control varies by the positioning of centertap 44A of potentiometer 44.

In the preferred arrangement of the circuit, amplifying transistor 34 and sensing transistor 38 may be any type of NPN transistor which has relative high forward current transfer ratios near zero base current. Amplifying transistor 36 and sensing transistor 40 are PNP transistors which should preferably have a relatively high forward current transfer ratio near zero base current. Sensing transistor 38 and 40 should have complementary characteristics. The field effect transistors 52A and 52B may be either of the N channel or P channel type as long as diodes 50A and 50B are arranged in the proper polarity. Isolating transistor 60 should be of the field effect type since proper circuit functioning requires that its signal source (capacitor 46) be of high impedance. Potentiometer 44 should be of a value high enough to cause little effect on reset rate. Potentiometer 58 should be high enough to minimize the loading of capacitor 46. Resistor 62 plus the dynamic source to drain resistance of isolating field effect transistor 60 must form with capacitor 72 the range of time constant to give proper phase control pulses to silicon control rectifier 74 through unijunction firing transistor 66. Resistor 68 must be of a value to deliver proper bias to unijunction firing transistor 66.

The invention provides an improved solid state servo circuit including control which is a selectable composite of proportioning plus reset control. The circuit of the invention is unique in its simplicity and provides for a very close control without cycling or appreciable droop. It can be made extremely compact and has particular utility for controlling small process inputs.

The voltage drop across potentiometer 58, or the conductance of isolating field effect transistor 60 determined thereby, can be used to regulate the power input to a variety of electrical devices, pump motor 10 being shown as an exemplification of the application of the servo circuit of this invention. In like manner, the error signal applied to the control circuit may be derived from a number of detector devices other than the differential transformer 16 illustrated. The names given transistors in the circuit are applied merely to assist in distinguishing transistors from each other and the names are not intended to limit or define the actual functioning of the transistors in the servo circuit.

While the invention has been described with a certain degree of particularity it is manifest that many changes may be made in the arrangement of the components of the circuit without departing from the spirit and scope of the disclosure. It is understood that the invention is not limited by the summary, nor the embodiment which is disclosed and described for purposes of exemplifying the invention, but the invention is to be limited only by the scope of the appended claims, including the full range of equivalency to which each element thereof is entitled.

What is claimed is:

1. A servo circuit for regulating a control voltage for maintaining a value of a system at a preselected level comprising:
    means for detecting the deviation of said system from the preselected level in the form of a voltage error signal;
    a DC voltage source having a positive and a negative pole;
    a transistor having a base, a collector and an emitter electrode;
    a circuit load means in series with said transistor collector and emitter electrodes across said voltage source, the said voltage error signal being applied to said transistor base electrode, the point between the transistor and the circuit load means being a first circuit common point, the voltage at said first circuit common point being a signal proportional to said error signal;
    a first and second resistor and a capacitor in series between said first circuit common point and said voltage source negative pole providing a second circuit common point between said seriesed resistors and said capacitor;
    bidirectional constant current circuit means between said first and second circuit common points regulating the rate of charging and discharging of said capacitor, the voltage across said capacitor being a reset voltage signal of a value which is the integral of the voltage at the first circuit common point, the output control voltage signal being taken between said seriesed resistors and the voltage source negative pole, the output control voltage signal being a composite of the proportional voltage signal at the first circuit common point and the reset voltage signal across said capacitor.

2. A servo circuit according to claim 1 wherein said constant current circuit means includes:
    two paralleled constant current circuits each of which includes:
    a diode in series, the diode in one constant current circuit being oppositely oriented from the diode in the other constant current circuit;
    a field effect transistor having a gate, a source, and a drain electrode, the drain and source electrodes being in series with said diode; and
    a resistor in series with the source electrode, the voltage drop across the resistor being applied to the gate electrode to bias the transistor.

3. A servo circuit for regulating a control voltage for maintaining a value of a system at a preselected level comprising:
    means for detecting the sense and magnitude of the deviation of said system from the preselected level in the form of one of a positive and negative error voltage, the polarity of said voltage being determined by the direction of deviation from said preselected level and the magnitude of said voltage being proportional to the degree of deviation;
    a DC voltage source having a positive and negative pole;
    an NPN transistor having a base, a collector and an emitter electrode;
    a PNP transistor having a base, a collector and an emitter electrode, the emitters of said NPN and PNP transistors being connected together providing a first circuit common point therebetween, the collector of said NPN transistor being connected to said voltage source positive pole and the collector of said PNP transistor being connected to said voltage source negative pole, said positive error voltage being applied to said NPN transistor base electrode and said negative error voltage being applied to said PNP transistor base electrode, the voltage between said first circuit common point and said voltage source negative pole being a signal voltage proportional to the magnitude and sense of said error voltage;

a first and second resistor and a capacitor in series between said first circuit common point and said voltage source negative pole providing a second circuit common point between said seriesed resistors and said capacitor;

bidirectional constant current circuit means between said first and second circuit common points regulating the rate of charging and discharging of said capacitor, the voltage across said capacitor being a reset voltage signal of a value which is the integral of the voltage at the first circuit common point, the output control voltage signal being taken between said seriesed resistors and the voltage source negative pole, the output control voltage signal being a composite of the proportional voltage signal at the first circuit common point and the reset voltage signal across said capacitor.

4. A servo circuit according to claim 3 wherein said constant current circuit means includes two paralleled constant current circuits each of which includes:

a field effect transistor having a gate, a source, and a drain electrode;

a diode in series with said drain and source electrodes, the diode in one constant current circuit being oppositely oriented from the diode in the other constant current circuit; and a resistor in series with said transistor source electrode, the voltage drop across said resistor being applied to said gate electrode to bias said field effect transistor.

5. A servo circuit according to claim 4 wherein said resistor in series with said field effect transistor in each of said constant current circuits is variable.

6. A servo circuit according to claim 3 wherein said first and second resistors include a potentiometer having a centertap, the output control voltage signal being taken between the potentiometer centertap and said voltage source negative pole.

7. A servo circuit according to claim 3 including:

a rectified full wave DC pulsating voltage source having a positive and a negative pole;

a silicon controlled rectifier having an anode, a cathode and a gate electrode;

circuit means in series with the silicon controlled rectifier anode-cathode circuit and said pulsating voltage source supplying voltage for maintaining said value of said system at a preselected level; and circuit means biasing said gate electrode to fire said silicon controlled rectifier in response to the level of said output control voltage signal.

8. A servo circuit according to claim 7 wherein said circuit means biasing said gate electrode to fire said silicon controlled rectifier in response to the voltage level of said output control voltage signal includes:

a field effect transistor having a gate, a drain, and a source electrode;

circuit means applying said output control voltage signal to the gate-source circuit of said field effect transistor;

a firing capacitor in series with said field effect transistor source electrode, said field effect transistor drain electrode and said firing capacitor being connected across said rectified voltage source whereby said capacitor is charged on each half cycle thereof at a rate determined by the conductance of said transistor which in turn is determined by the level of said output control voltage signal; and circuit means firing said silicon controlled rectifier in response to the charge on said firing capacitor.

9. A servo circuit according to claim 8 wherein said circuit means firing said silicon controlled rectifier in response to the charge on said firing capacitor includes:

a firing transformer having a primary and a secondary, the secondary thereof being connected between the gate and cathode electrodes of said silicon controlled rectifier;

a unijunction firing transistor having an emitter, a first base, and a second base electrode, the primary of said firing transformer being connected in series with said first and second base electrodes across said rectified voltage source, the emitter electrode thereof being connected to receive the voltage across said firing capacitor whereby said unijunction firing transistor conducts on each half cycle of said rectified voltage source when the charge on said firing capacitor reaches the level of conduction bias of said unijunction firing transistor, the conduction of said unijunction firing transistor serving to impart a firing voltage signal through said firing transformer to said silicon controlled rectifier.

References Cited

UNITED STATES PATENTS 3,327,186  6/1967  Gregory et al.
3,369,160  2/1968  Koppel et al.

THOMAS E. LYNCH, Primary Examiner

U.S. Cl. X.R.

318—28